(12) United States Patent
Hausmann et al.

(10) Patent No.: US 12,191,535 B2
(45) Date of Patent: Jan. 7, 2025

(54) SEPARATOR PLATE FOR A FUEL CELL

(71) Applicant: cellcentric GmbH & Co. KG, Kirchheim (DE)

(72) Inventors: Philipp Hausmann, Kirchheim (DE); Markus Schudy, Kirchheim (DE)

(73) Assignee: cellcentric GmbH & Co. KG, Kirchheim (DE)

( * ) Notice: Subject to any disclaimer, the term of this patent is extended or adjusted under 35 U.S.C. 154(b) by 562 days.

(21) Appl. No.: 17/437,514

(22) PCT Filed: Mar. 16, 2020

(86) PCT No.: PCT/EP2020/057084
§ 371 (c)(1),
(2) Date: Sep. 9, 2021

(87) PCT Pub. No.: WO2020/200732
PCT Pub. Date: Oct. 8, 2020

(65) Prior Publication Data
US 2022/0149391 A1 May 12, 2022

(30) Foreign Application Priority Data
Mar. 29, 2019 (DE) .......................... 102019002310.2

(51) Int. Cl.
*H01M 8/0247* (2016.01)
*H01M 8/0232* (2016.01)
(Continued)

(52) U.S. Cl.
CPC ....... *H01M 8/0247* (2013.01); *H01M 8/0232* (2013.01); *H01M 8/0258* (2013.01); *H01M 8/1004* (2013.01)

(58) Field of Classification Search
CPC ............. H01M 8/0247; H01M 8/0232; H01M 8/0258; H01M 8/1004; H01M 8/0256; H01M 8/0202; Y02E 60/50
See application file for complete search history.

(56) References Cited

U.S. PATENT DOCUMENTS

| | | | |
|---|---|---|---|
| 2004/0038102 A1* | 2/2004 | Beckmann | H01M 8/0254 429/465 |
| 2005/0064270 A1* | 3/2005 | Marianowski | H01M 8/026 429/492 |

(Continued)

FOREIGN PATENT DOCUMENTS

| | | |
|---|---|---|
| DE | 10047248 A1 | 4/2002 |
| DE | 102005007353 A1 | 9/2005 |

(Continued)

OTHER PUBLICATIONS

International Search Report issued on May 29, 2020, in International Application No. PCT/EP2020/057084.

*Primary Examiner* — Muhammad S Siddiquee
(74) *Attorney, Agent, or Firm* — Patent Central LLC; Stephan A. Pendorf

(57) ABSTRACT

A separator plate (1) for media guiding in a fuel cell, with at least one through-opening (2, 3, 4, 5, 6, 7) for supplying and at least one through-opening (2, 3, 4, 5, 6, 7) for discharging a medium, with a channel structure (12) for uniformly guiding the medium, as well as with distribution regions (9) which connect the through-openings (2, 3, 4, 5, 6, 7) with the channel structure (12). At least one of the distribution regions (9) surrounds at least one of the through-openings (2, 3, 4, 5, 6, 7) associated with it around the entire perimeter.

9 Claims, 3 Drawing Sheets

Figure 4:
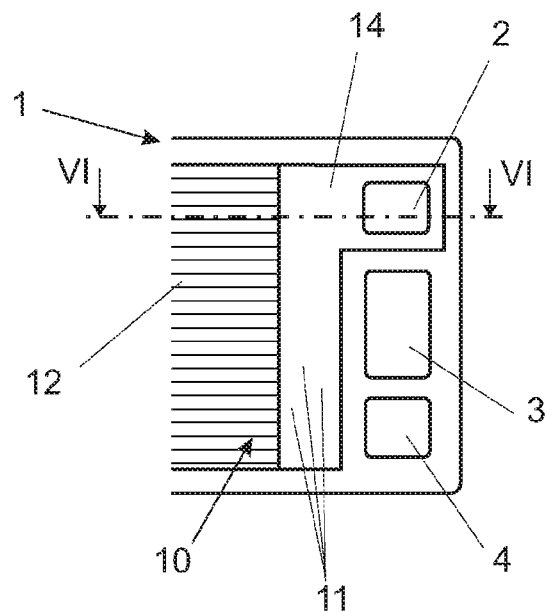

(51) Int. Cl.
*H01M 8/0258* (2016.01)
*H01M 8/1004* (2016.01)

(56) References Cited

U.S. PATENT DOCUMENTS

| | | | |
|---|---|---|---|
| 2005/0186464 | A1 | 8/2005 | Sugiura et al. |
| 2009/0181280 | A1 | 7/2009 | Beutel |
| 2011/0177423 | A1 | 7/2011 | Nachtmann et al. |

FOREIGN PATENT DOCUMENTS

| | | |
|---|---|---|
| DE | 102009003946 A1 | 7/2009 |
| DE | 102010062396 A1 | 6/2012 |
| EP | 1422774 A1 | 5/2004 |
| JP | 2006221905 A1 | 8/2006 |
| WO | 0225765 A2 | 3/2002 |

\* cited by examiner

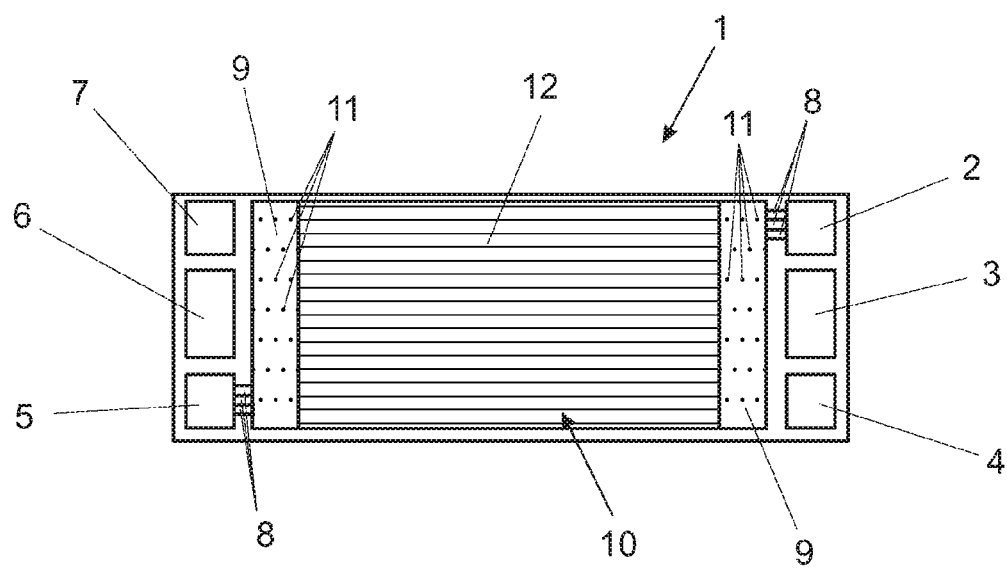
FIG. 1 (prior art)
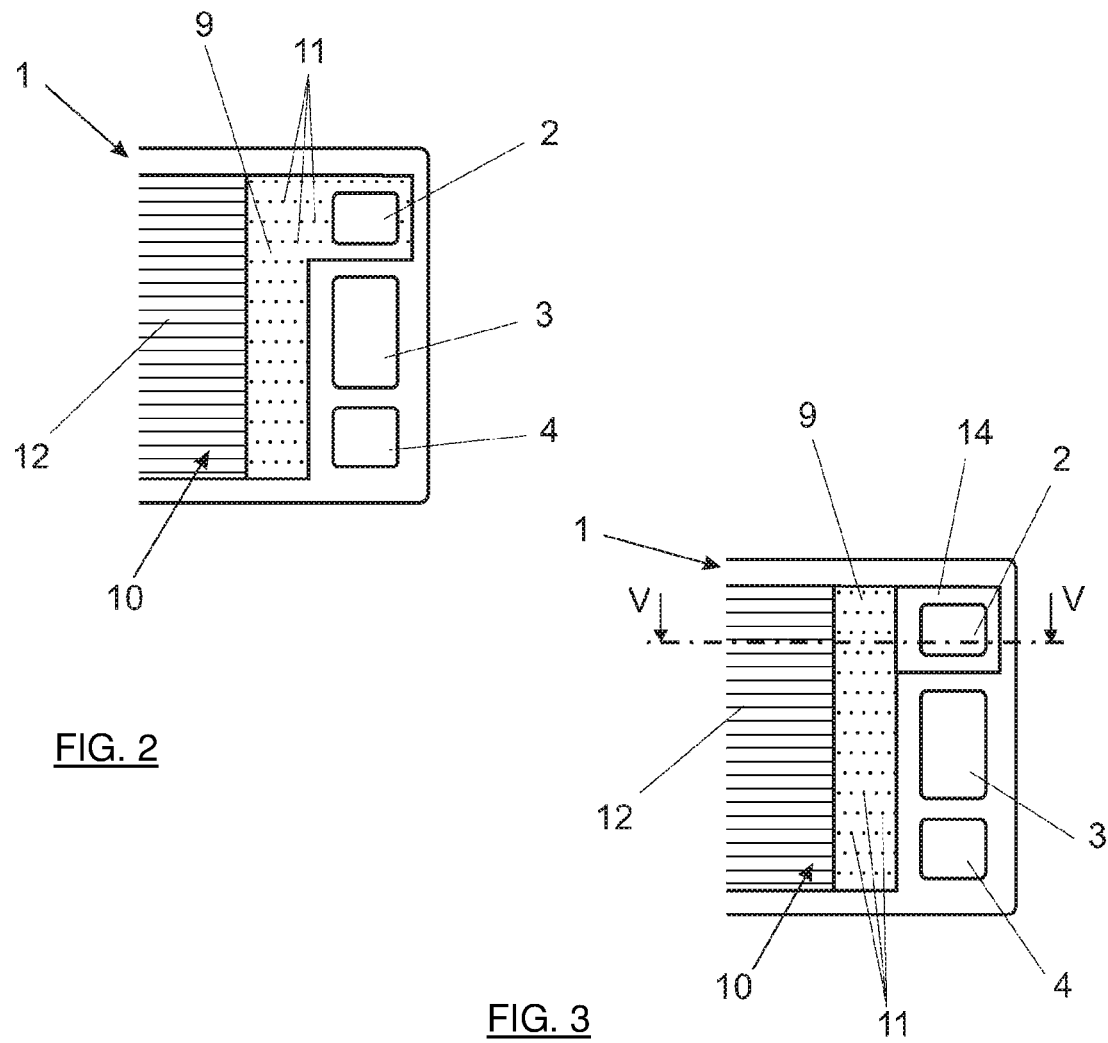
FIG. 2
FIG. 3

SEPARATOR PLATE FOR A FUEL CELL

The invention relates to a separator plate for media guiding in a fuel cell, of the type defined in more detail in the preamble of claim 1.

The construction of a fuel cell stack out of a plurality of individual cells is known from the prior art. In the case of a fuel cell in PEM technology, for example, a so-called membrane electrode assembly (MEA) is arranged between two separator plates that feed the anode-side and cathode-side media, which consist of a gas diffusion layer, the catalysts and the actual membrane, which forms the electrolyte of the individual cell, and optionally an electrically insulating film or layer. The separator plates are then often combined to form what are known as bipolar plates, so that one surface of the separator plate forms the anode side of one cell and the other surface forms the cathode side of the adjacent cell. It is often the case that channels for a cooling medium for discharging waste heat from the fuel cell are also provided between the surfaces of the separator plates or also between two partial plates of the bipolar plate. All of this is known to the skilled person from the prior art.

The separator plates are typically constructed in such a way that they have different through-openings which, when the individual cells are stacked on top of one another, form continuous channels with their separator plates within the so-called fuel cell stack. The through-openings are then responsible for the supply and discharge of the media. Depending on the surface of the separator plate and its function, for example to distribute the hydrogen on the anode side, channel structures are then arranged in the separator plate for uniform distribution of the medium, here for example the hydrogen, on the anode side of the MEA. These are connected to the respective through-opening for supplying the hydrogen via a distribution region and connecting channels, which are also referred to as vias. The same applies to the other side of the separator plate in the direction of flow. A distribution region is arranged here as well, which is accordingly arranged with a through-opening for discharging the residual hydrogen and the product water that has formed. Other through-openings serve for supplying and discharging air, for example on the opposite side of the plate and/or for supplying and discharging cooling medium, for example between two partial plates of a bipolar plate with a surface facing the anode and the cathode. This too is known to the skilled person from the prior art. The problem with this construction is that the fuel cell stacks, depending on their installation position, tend to varying degrees to be blocked by frozen water in the area of the distribution plates, so that in practice it is typically necessary to pay very close attention to a suitable installation position. In addition, it is the case that the separator plates have a relatively high pressure loss and thus offer a high level of resistance to the media flowing through their structures for guiding the media.

For further prior art, reference may be made purely by way of example to DE 10 2009 003 946 A1 and US 2011/0177423 A1 with regard to such structures.

The object of the present invention is to provide an improved separator plate having a structure according to the preamble of claim 1, which is improved over the prior art and in particular avoids or minimizes the above disadvantages with regard to the installation position and the pressure loss.

According to the invention, this object is achieved by a separator plate having the features in claim 1, and here in particular in the characterizing part of claim 1. Advantageous configurations and developments of the separator plate can be found in the claims dependent thereon.

The solution according to the invention provides that the distribution region is designed in such a way that it is directly connected to the through-opening associated with it and surrounds it around its entire perimeter. The through-opening is therefore within the distribution region and is no longer connected to these through the supply channels or vias, as in the prior art. The inventors have recognized that this enables the pressure losses to be reduced significantly, since a correspondingly larger flow cross-section is now available to optimize the transfer of gases from the area of the through-opening into the distribution region and thus ultimately into the channel structures for the distribution of the media, for example for cooling purposes or for the application of the media to the total area of the individual cell.

Another very decisive advantage is that the arrangement in which the distribution region surrounds the through-opening associated with it around its entire perimeter offers the advantage that gases coming from the area of the through-opening or flowing into the through-opening have access to the through-opening from all directions. If, due to the installation position, one side is wetted by moisture and blocked by ice when the temperature drops below freezing point, then other sections are still available around the perimeter of the through-opening to ensure the flow of the respective medium into the channel structures over the distribution region drawn around the entire perimeter of the through-opening. This means that a mandatory predetermined installation position in order to be able to safely start the fuel cell stack even under freezing conditions is no longer necessary. Rather, the stack can be installed in the most favorable manner with respect to the packaging, which is a very decisive advantage in particular in vehicle applications of the fuel cell stack, where the problem of a freeze start often occurs in particular. As a result, the existing installation space can be ideally exploited and thus a small, compact and relatively light fuel cell system can be created that can be mounted in a given body.

According to an advantageous embodiment of the idea, the distribution regions comprise support structures in the form of fins and/or nubs. For one thing, these support structures help the structure so that the distribution region is not compressed even in the case of strong compressive forces with which the fuel cell stack is tensioned. In addition, the support structures, especially if they are designed in the form of nubs and thus form an open structure in the distribution region, have the advantage that they guide the flow relatively evenly through the distribution region or that the flow can "find" its preferred path. Should individual areas be blocked by water or ice, these areas are simply flowed around, so that overall a very good flow distribution can be achieved even in difficult operating situations. This is a very decisive advantage especially of the nubs or fins compared to self-contained individual channels.

The distribution regions also comprise these support structures, in particular nubs, in the part of the distribution region arranged around the through-opening. According to a very advantageous development of the separator plate according to the invention, it can now be provided that at least the part of the distribution region arranged around the through-opening is covered with an intermediate layer. Such an intermediate layer arranged around the opening provides a cover for this part of the distribution region with the advantage of offering ideal conditions by having a planar structure on its side facing away from the distribution region, which then serves as a contact surface for a sealing material that is arranged around the through-openings and along the outer edge of the separator plate. Only the area around the through-opening can be covered, for example with an annular intermediate layer whose outer contour follows the corresponding contour of the distribution region around the through-opening, and which releases the through-opening with a corresponding inner contour so that media can also flow through the through-opening to the next adjacent plate. As an alternative to this, it can also be provided that the entire distribution region is covered with the corresponding intermediate layer. This can be advantageous depending on the structural design and with regard to the tolerances of the components and creates a correspondingly large area in the distribution region, which typically does not correspond to an electrochemically active area of the MEA, for simple and reliable sealing of the stack of individual fuel cells with separator plates of this type.

The support structures can be arranged in the distribution region in such a way that they are formed on the separator plate itself, for example by embossed nubs or also embossed nubs and corresponding depressions, which then form the nubs of a distribution region on the opposite side, for example for the cooling medium. Alternatively, according to a very advantageous development of the idea, it can also be provided that the support structures are formed in the intermediate layer. The support structures are then implemented in the intermediate layer so that the actual distribution plate only has the channel structure, for example, and has a smooth surface in the area of the distribution region. This can be particularly advantageous if further components are arranged on the opposite side or if corresponding structures are required there, so that the material thickness and stability of the distribution region can be optimized by relocating the support structures into the intermediate layer.

According to a very advantageous development of the idea, the separator plate can be made of metal. Such separator plates made of metal, for example as partial plates of a so-called metallic bipolar plate, have the advantage that they can be made very thin and yet very stable. However, alternative configurations, for example made of graphite, carbon or an electrically conductive plastic, are also conceivable.

In particular when the separator plate is made of metal, it can now be provided according to an advantageous development of the separator plate that the intermediate layer is produced by reshaping from the material which was previously arranged in the through-openings. In the case of a metallic separator plate, the through-openings can be realized in particular by punching or cutting out, for example with a laser. With this design variant, it is now conceivable to simply cut the material in the area of the later through-openings in the desired way and then reshape it, for example by pulling, bending or the like, in order to form the intermediate layer in one piece from the material of the separator plate and design it accordingly. The structure is particularly suitable for realizing an intermediate layer which only covers the parts around the through-opening. For this purpose, the material can be cut accordingly and bent or pulled upwards, in order to then crimp it in the area around the through-opening, where of course corresponding openings or holes must be present so that the connection of the distribution region realized around the entire perimeter is still given at the through-opening.

The phrase "around the entire perimeter" in the context of the invention also includes a structure which creates a connection between the distribution region and the through-opening in this area via a grid, a perforated plate structure or the like, as long as this structure surrounds the entire perimeter of the through-opening with a largely uniform structural design.

An alternative embodiment, in which the production step described last cannot be realized, though, is the production of the intermediate layer from plastic. Such an intermediate layer made of plastic can be realized both in the case of a metallic separator plate and in the case of a separator plate made of a different type of electrically conductive material, for example graphite or the like. The structure is correspondingly simple and efficient and can be inserted, for example, into the structure of the separator plate.

According to a very advantageous development of the idea, it is provided that the intermediate layer is designed to be connected to an MEA. The intermediate layer can therefore be correspondingly connected, for example by gluing or welding, to the MEA, i.e. the top layer of the MEA which faces the respective separator plate, for example a film or a frame surrounding it or the like, which comes to lie in the area of the through-openings and the distribution region. This means that when the MEA is positioned, the intermediate layer is precisely positioned in the position specified for it, so that production is relieved of one step during assembly.

As already mentioned, the through-openings in the separator plate can be used for supplying and discharging any form of media, in particular for supplying oxygen or air, hydrogen or hydrogen-containing gas and/or cooling medium. According to a very advantageous development of the idea, the through-openings, which are surrounded by the distribution region around the entire perimeter, are designed for supplying and discharging reagents and products.

The structure is therefore realized in the manner described on the anode and cathode side and, in this embodiment variant, not in the area of the cooling medium. The above advantages, which occur primarily in the region of the cathode side and the anode side, can nevertheless be achieved, because the problems mentioned at the beginning do not occur, or at least not to the same extent, for the side on which the cooling medium is guided.

The separator plate can be designed as any separator plate here. According to an extremely favorable development of the invention, it can, as already mentioned several times by way of example, be shaped as part of a bipolar plate, so that two such separator plates, which are placed with their backs against each other, form a bipolar plate, which is connected on one side with the anode of the one cell and on the other side with the cathode of the other adjacent cell, and which in particular comprises a structure for cooling media between the two separator plates serving as parts of the bipolar plate. The cooling media do not necessarily have to be supplied and discharged via through-openings. If necessary, it is also sufficient to leave cooling medium-carrying channels between the two separator plates open at the sides as parts of the bipolar plate and to connect them to a supply and discharge of a cooling medium, be it liquid or gaseous. For example, by arranging a housing through which cooling medium flows around the fuel cell stack.

Figure 5:
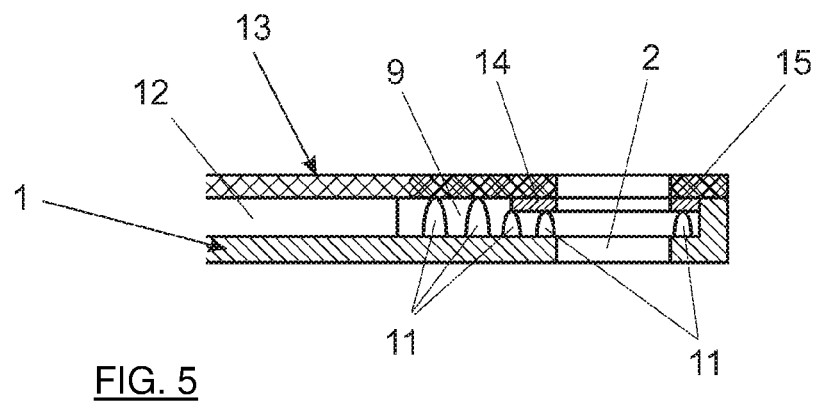
Figure 6:
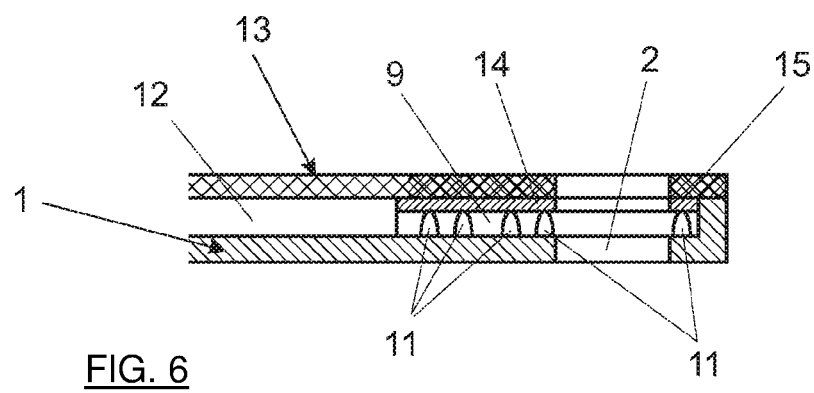
Figure 7:
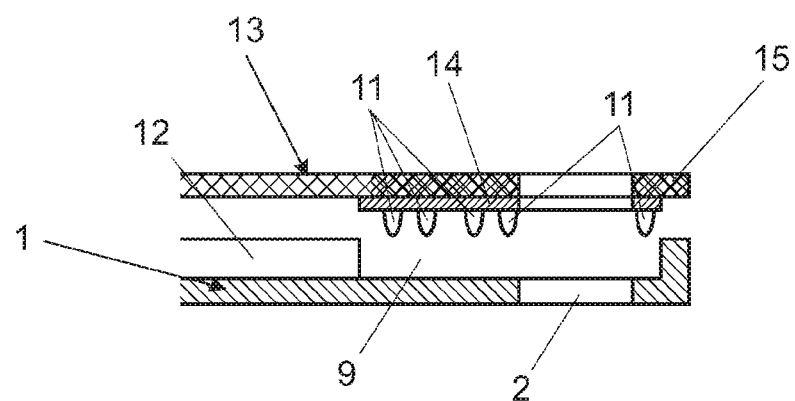
Figure 8:
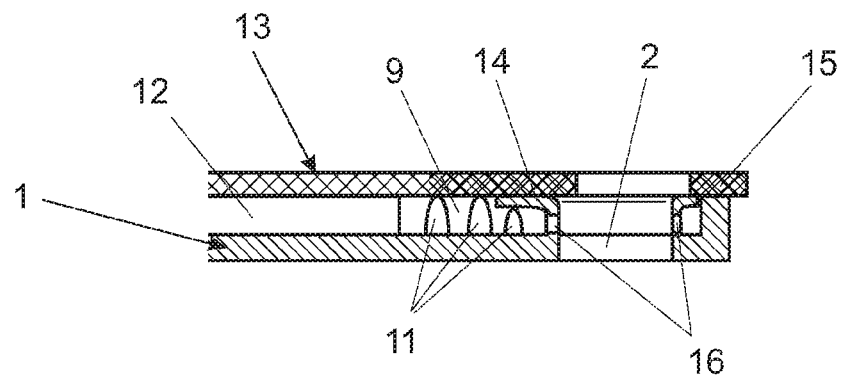

Further advantageous configurations of the separator plate also result from the exemplary embodiments, which are described in more detail below with reference to the figures. These show:

FIG. 1 the plan view of a separator plate in an embodiment according to the prior art;

FIG. 2 a section of a separator plate in an embodiment according to the invention;

FIG. 3 the section analogous to FIG. 2 with a first variant of an intermediate layer;

FIG. 4 the section analogous to FIG. 2 with a second variant of an intermediate layer;

FIG. 5 sectional view along the line V-V in FIG. 3;

FIG. 6 sectional view along the line VI-VI in FIG. 4;

FIG. 7 an alternative embodiment of the structure in an exploded view analogous to the sectional view in FIG. 6; and FIG. 8 a further embodiment, essentially analogous to that in FIG. 5.

FIG. 1 shows the plan view of a separator plate designated by 1, for example the anode side of a bipolar plate. The structure essentially corresponds to the prior art, but is not shown to scale. The separator plate 1 has several through-openings 2 to 7 on its two sides, which are used for supplying and discharging media. In the exemplary embodiment shown here, the top view of the surface of the separator plate 1, which faces the anode side of an adjacent individual cell, not shown, of a fuel cell stack, also not shown, can be seen. For example, it has the through-opening marked 2 at the top right, which, together with comparable through-openings in adjacent separator plates, forms a supply channel for hydrogen. The hydrogen then flows through this through-opening 2, which forms part of the supply channel, to each of the separator plates 1 and via connecting channels designated by 8, so-called vias, into a distribution region 9 of a flow field designated in its entirety by 10. The distribution region 9 has an open structure, for example with the nubs 11 indicated here, in order to enable the hydrogen to be distributed transversely. A channel structure 12 is located in the course of the flow field 10 extending further in the direction of flow. Via this channel structure 12 with parallel channels closed to one another, the gases are distributed to the anode side of the individual cell on its active surface, in particular a gas diffusion layer of a so-called membrane electrode assembly (MEA) 13. The distribution region 9 helps enable all channels of the channel structure 12 to be flowed through as evenly as possible. After flowing through the channels of the channel structure 12, the residual gas, mixed with the product water created in the fuel cell, reaches a further distribution region 9 as a collection area, in which the gas/liquid mixture collects accordingly. It then flows through further connecting channels 10 on the outflow side into the opening denoted by 5, which, together with further analogous through-openings in the adjacent separator plates 1, forms a discharge channel.

It is often the case that the bipolar plates are formed from two partial plates in the form of the separator plates 1, which are connected to one another with their rear sides, for example welded in the case of metallic bipolar plates. They then form further channels between their rear sides through which cooling liquid can flow via the through-openings 3 and 6. All of this is known to the person skilled in the art, so that it does not need to be discussed further.

In the illustration in FIG. 2, a section from the separator plate 1 is now shown that is relevant to the separator plate 1 according to the invention. The invention is illustrated using the example of the through-opening 2, through which the hydrogen is to flow in. It can be used accordingly just as well for each of the other through-openings 3 to 7, both for supplying and discharging a reagent or product or also for the cooling medium, so that the following remarks about through-opening 2 can be transferred analogously to all other through-openings 3 to 7.

The core idea is that the distribution region 9 extends around the entire perimeter of the through-opening 2. Unlike in the prior art, the through-opening 2 is therefore not only connected to the distribution region 9 via the connecting channels or vias 8, but is directly connected to it or is located within the surface of the distribution region 9. This has the nubs 11 in its entire area, i.e. also around the through-opening 2, in order to achieve sufficient stability against pressure forces when the individual cells are stacked and at the same time to provide an open structure around the entire perimeter of the through-opening 2. This ensures that gas can penetrate as far as the channel structure 12 even in the event of parts of the distribution region 9 being blocked by ice, so that a largely arbitrary installation position of a fuel cell or a fuel cell stack with such separator plates 1 can be realized which is freeze-startable even under adverse conditions, because a blockage of the transition from the through-opening 2 into the distribution region 9 and thus ultimately into the channel structure 12, which distributes the gases to the active surface of the individual cell, is ensured in any case.

In the previous structures, too, an intermediate layer, which is sometimes also referred to as a shim, covers the connecting channels 8 in order to ensure a clean contact of a MEA 13 or a plastic frame 15 formed around the active surface of the MEA, typically made of polyethylene naphthalate (PEN). Such an intermediate layer, which is designated here by 14, is indicated purely by way of example in the illustration in FIG. 3. The structure can then be seen again in the associated sectional illustration in FIG. 5 along the line V-V in FIG. 3. The nubs 11 are designed slightly lower in height in the area around the through-opening 2, so that the intermediate layer 14 finds space thereon and then forms a flat support surface for the MEA 13 shown here or in the distribution region 9 for its PEN frame 15. The PEN frame thus comes to rest cleanly and reliably around the through-opening 2 and can form the opposing surface for seals between the individual parts of the fuel cell stack. Of course, the PEN frame 15 and the intermediate layer 14 also have a corresponding through-opening analogous to the through-opening 2, in order to ensure the transmission of the gases to the neighboring cells.

In the illustration in FIG. 4 and again here in the sectional illustration in FIG. 6, analogous to the illustration in FIG. 4, it can be seen that the intermediate layer 14 is designed somewhat larger here. It covers not only the parts of the distribution region 9 directly around the through-opening 2, but also the entire distribution region 9 or, in an alternative embodiment not shown here, only parts thereof. The structure otherwise corresponds to the structure described in FIGS. 3 and 5, the nubs 11 here being designed at the same height throughout.

In the previous embodiments, the nubs 11 were always formed as part of the separator plate 1 itself, for example by being stamped into the separator plate from below in the illustrations of FIGS. 5 and 6. Of course, embossing both from below and from above are also conceivable, so that in this case, for example, further nubs are created on the lower surfaces just drawn in here, which could then, for example, form the distribution region for the cooling medium.

In the illustration in FIG. 7, an alternative embodiment is now shown in an exploded view. The illustration essentially corresponds to that in FIGS. 5 and 6. The nubs 11 are not formed here on the actual separator plate 1, but on the intermediate layer 14, so that the separator plate 1 can be designed flat, which is particularly advantageous in the case of a sealing connection on the underside shown in FIG. 7, since this can be then be executed reliably flat. The intermediate layer 14 can for example be made of a metallic material or also of plastic, for example by embossing, injection molding, sintering or 3D printing. In the case of the design made of plastic, it would now be particularly possible, and this is indicated purely by way of example in FIG. 7, to correspondingly connect the intermediate layer 14 to the MEA 13 or its PEN frame 15, for example by gluing. This makes it possible to simply place the MEA 13 with its PEN frame 15 on the separator plate 1 and, together with the exact positioning of the MEA 13 or its active surface over the channel structures 12, also to safely and reliably position the intermediate layer 14. This is conceivable both with the arrangement of the nubs 11 on the intermediate layer 14, as shown in FIG. 7, but also with an inverted arrangement of the nubs 11, as shown for example in FIGS. 5 and 6.

An alternative would be, for example, the design of the intermediate layer 14 from metal, as mentioned above. In this case, the intermediate layer could, for example, be welded to the nubs 11 located on the separator plate 1 in order to fix them in their position. Here, too, it is of course conceivable to integrate the nubs 11 into the intermediate layer 14. These can then also be correspondingly welded to the separator plate 1 without changing the functional principle described.

In the illustration in FIG. 8, a further embodiment of the intermediate layer 14 can be seen, which necessitates a metallic embodiment of the separator plate 1. The material which is arranged in the area of the through-opening 2 is cut laterally in this variant, for example by laser cutting, and provided with individual openings or holes 16 around the entire perimeter of the subsequent through-opening 2. The material originally cut in this way in the region of the through-opening 2 is then reshaped, for example bent over and/or crimped or pulled. The intermediate layer 14 can thus be made in one piece with the separator plate 1 in that the corresponding material is bent over and then, where necessary, comes to rest on the nubs 11, as indicated accordingly in FIG. 8. Like the intermediate layer described above, it can be welded to the nubs 11 when it is positioned at the desired location. This structure has the advantage that only a single material is used and the otherwise wasted cut-out material of the through-opening can be used directly for the intermediate layer. In order to ensure the even outflow of the medium from the through-opening into the distribution region 9, numerous openings 16 arranged over the perimeter of the opening 2 are provided in the material, which can run around the perimeter of the opening 2, for example in the manner of a perforation, to facilitate the deformation of the material in this area accordingly and to ensure the required flat surface for supporting the PEN frame 15 of the MEA 13.

The invention claimed is:

1. A separator plate (1) for media guiding in a fuel cell, comprising
at least one through-opening (2, 3, 4, 5, 6, 7) for supplying and at least one through-opening (2, 3, 4, 5, 6, 7) for discharging a medium,
a channel structure (12) for uniformly guiding the medium, as well as distribution regions (9) which connect the through-openings (2, 3, 4, 5, 6, 7) with the channel structure (12),
wherein at least one of the distribution regions (9) surrounds at least one of the through-openings (2, 3, 4, 5, 6, 7) associated with it around the entire perimeter, and
wherein at least that part of the distribution region (9) arranged around the through-opening (2, 3, 4, 5, 6, 7) is covered with an intermediate layer (14).

2. The separator plate (1) according to claim 1, wherein the distribution regions (9) comprise support structures in the form of fins and/or nubs (11).

3. The separator plate (1) according to claim 1, wherein the support structures are formed in the intermediate layer (14).

4. The separator plate (1) according to claim 1, wherein the separator plate (1) is metal.

5. The separator plate (1) according to claim 1, wherein the intermediate layer (14) is produced by reshaping from the material which was previously arranged in the through-opening (2, 3, 4, 5, 6, 7).

6. The separator plate (1) according to claim 1, wherein the intermediate layer (14) is made of plastic.

7. A separator plate (1) for media guiding in a fuel cell, comprising
an MEA (13) or a frame (15) having at least one through-opening (2, 3, 4, 5, 6, 7) for supplying and at least one through-opening (2, 3, 4, 5, 6, 7) for discharging a medium,
a channel structure (12) for uniformly guiding the medium, as well as distribution regions (9) which connect the through-openings (2, 3, 4, 5, 6, 7) with the channel structure (12),
wherein at least one of the distribution regions (9) surrounds at least one of the through-openings (2, 3, 4, 5, 6, 7) associated with it around the entire perimeter,
wherein at least that part of the distribution region (9) arranged around the through-opening (2, 3, 4, 5, 6, 7) is covered with an intermediate layer (14), and
wherein the intermediate layer (14) connected to the MEA (13) or the frame (15).

8. The separator plate (1) according to claim 1, wherein the through-openings (2, 4, 5, 7) are adapted for supplying and discharging reagents and products.

9. The separator plate (1) according to claim 1, wherein the separator plate (1) is part of a bipolar plate.

* * * * *